US010624148B1

(12) United States Patent
Bainbridge et al.

(10) Patent No.: US 10,624,148 B1
(45) Date of Patent: Apr. 14, 2020

(54) IMPLEMENTATION OF CORE CELLULAR NETWORKING STACK ON CLOUD INFRASTRUCTURE

(71) Applicant: Microsoft Technology Licensing, LLC, Redmond, WA (US)

(72) Inventors: Noel Andrew Bainbridge, Cambridge (GB); Matthew John Balkwill, Trobridge (GB); Bozidar Radunovic, Cambridge (GB)

(73) Assignee: Microsoft Tehnology Licensing, LLC, Redmond, WA (US)

( * ) Notice: Subject to any disclaimer, the term of this patent is extended or adjusted under 35 U.S.C. 154(b) by 0 days.

(21) Appl. No.: 16/180,908

(22) Filed: Nov. 5, 2018

(51) Int. Cl.
*H04W 76/25* (2018.01)
*H04L 29/06* (2006.01)
*H04L 29/08* (2006.01)

(52) U.S. Cl.
CPC ......... *H04W 76/25* (2018.02); *H04L 67/2842* (2013.01); *H04L 69/22* (2013.01)

(58) Field of Classification Search
CPC .................................................... H04W 76/25
USPC ........................................................ 370/328
See application file for complete search history.

(56) References Cited

U.S. PATENT DOCUMENTS

| 9,288,148 | B1 | 3/2016 | Krishnaswamy et al. |
| 9,661,522 | B2 | 5/2017 | Kavunder et al. |
| 10,063,443 | B2 | 8/2018 | Haraszti et al. |
| 2017/0134483 | A1 | 5/2017 | Miller |
| 2017/0251368 | A1 | 8/2017 | Ross et al. |
| 2018/0205574 | A1* | 7/2018 | Radunovic ................ H04L 1/18 |
| 2018/0262556 | A1 | 9/2018 | Firestone |

FOREIGN PATENT DOCUMENTS

EP      1511238 A2    3/2005

OTHER PUBLICATIONS

Satapathy et al., "Performance Comparison of State Synchronization Techniques in a Distributed LTE EPC," *In Proceedings of IEEE Conference on Network Function Virtualization and Software Defined Networks*, 7 pages, Nov. 6, 2017.
Nokia, "Nokia Cloud Mobile Gateway," Release 10, 8 pages (retrieved Sep. 6, 2018).

(Continued)

*Primary Examiner* — Peter G Solinsky
(74) *Attorney, Agent, or Firm* — Klarquist Sparkman, LLP

(57) ABSTRACT

Techniques are described for operating a core cellular network stack on a cloud computing environment (e.g., a public cloud infrastructure). For example, virtualized packet gateways can be run on virtual machines of the cloud computing environment and standard load balancers can distribute network traffic of the cellular network among the virtualized packet gateways. The virtualized packet gateways can be setup with a local cache of an external key-value store containing bearers of the cellular network and process received data plane network packets using the local cache. Bearers can be updated within the cellular network using the external key-value store, and virtualized packet gateways can obtain and use updated bearer details.

20 Claims, 8 Drawing Sheets

(56) References Cited

OTHER PUBLICATIONS

Roozbeh, "Distributed Cloud and De-Centralized Control Plane, a Proposal for Scalable Control Plane for 5G," *In Proceedings of IEEE/ACM International Conference on Utility and Cloud Computing*, 10 pages, Dec. 7, 2015.

Karla Saur, "Migrating the Next Generation Mobile Core Towards 5G with Kubernetes," <http://www.youtubc.com/watch?y=uf7GuK-dZ0&t=1806s>, 1 page (Jul. 12, 2018).

Karla Saur, "Migrating the Next Generation Mobile Core Towards 5G with Kubernetes," <https://speakerdeck.com/condayseu/migrating-the-next-generation-mobile-core-towards-5g-with-kubernetes-karla-saur>, 43 page (accessed Nov. 5, 2018).

* cited by examiner

IMPLEMENTATION OF CORE CELLULAR NETWORKING STACK ON CLOUD INFRASTRUCTURE

BACKGROUND

Cellular networks have traditionally been operated by telecommunications providers using custom hardware and software solutions. While it is possible to operate some components of a cellular network within a cloud infrastructure (e.g., using a public cloud provider), some of the components and technologies do not translate directly or efficiently to the cloud. For example, in an LTE cellular network, the control plane and user plane networks are considered to be separate networks. The control plane is responsible for setting up, configuring, and tearing down connections in the user plane. The user plane directly carries user data (network packets from user equipment). The serving gateway/packet gateway (SPGW) is a component through which the user packets flow. To handle the large volume of traffic, many SPGW instances may be needed. In a cloud implementation, each SPGW instance can run on its own virtual machine. These SPGW instances need to receive control plane messages so that they can correctly handle the user plane packets.

A load balancer within a cloud environment is designed to spread packets across (e.g., evenly across) a number of virtual machines. Typically, the load balancer has little control over which packets go to which virtual machine other than attempting to direct packets with the same source and destination address to the same virtual machine. As a result of running SPGW instances behind a load balancer in a cloud environment, the control plane and user plane data for a given user can be sent to different SPGW instances. In this situation, it may be difficult, or impossible, for control plane information to be sent to, or read by, the SPGW instance that needs it.

Therefore, there exists ample opportunity for improvement in technologies related to implementing cellular networking components within a cloud environment.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Technologies are described for operating a core cellular network stack on a cloud computing environment (e.g., a public cloud infrastructure). For example, virtualized packet gateways can be run on virtual machines of the cloud computing environment and standard load balancers can distribute network traffic of the cellular network among the virtualized packet gateways. The number of virtualized packet gateways can be scaled out (adding new virtualized packet gateways) or scaled down (removing virtualized packet gateways) with the load balancers distributing network traffic accordingly. The virtualized packet gateways can be setup with a local cache of an external key-value store (KVS) containing bearers of the cellular network and process received data plane network packets using the local cache. Bearers can be updated within the cellular network using the external key-value store, and virtualized packet gateways can obtain and use updated bearer details.

For example, a virtualized packet gateway within a cloud computing environment can perform operations to process data plane network packets for a cellular network. The virtualized packet gateway can receive an entire copy of an external key-value store, where the external key-value store comprises bearer details for all current bearers of the cellular network, and where the bearer details define network flows associated with user equipment using the cellular network. The virtualized packet gateway can save the entire copy of the external key-value store in a local cache. The virtualized packet gateway can receive data plane network packets from a load balancer. The virtualized packet gateway can process the data plane network packets, where the processing comprises identifying bearers associated with the data plane network packets in the local cache.

As another example, a virtualized packet gateway operating within a cloud computing environment can receive a first data plane network packet associated with a first bearer. Upon determining that the first bearer is not in a local cache, the virtualized packet gateway can retrieve bearer details for the first bearer from an external key-value store and store the retrieved bearer details for the first bearer in a local cache. The virtualized packet gateway can process the first data plane network packet based at least in part upon the bearer details for the first bearer stored in the local cache. The virtualized packet gateway can receive a network communication indicating that the first bearer has been updated. Responsive to receiving the network communication, the virtualized packet gateway can retrieve updated bearer details for the first bearer from the external key-value store and store the retrieved updated bearer details in the local cache. The virtualized packet gateway can receive a second data plane network packet associated with the first bearer and process the second data plane network packet based at least in part upon the updated bearer details for the first bearer stored in the local cache.

As described herein, a variety of other features and advantages can be incorporated into the technologies as desired.

DETAILED DESCRIPTION

Overview

Figure 1:
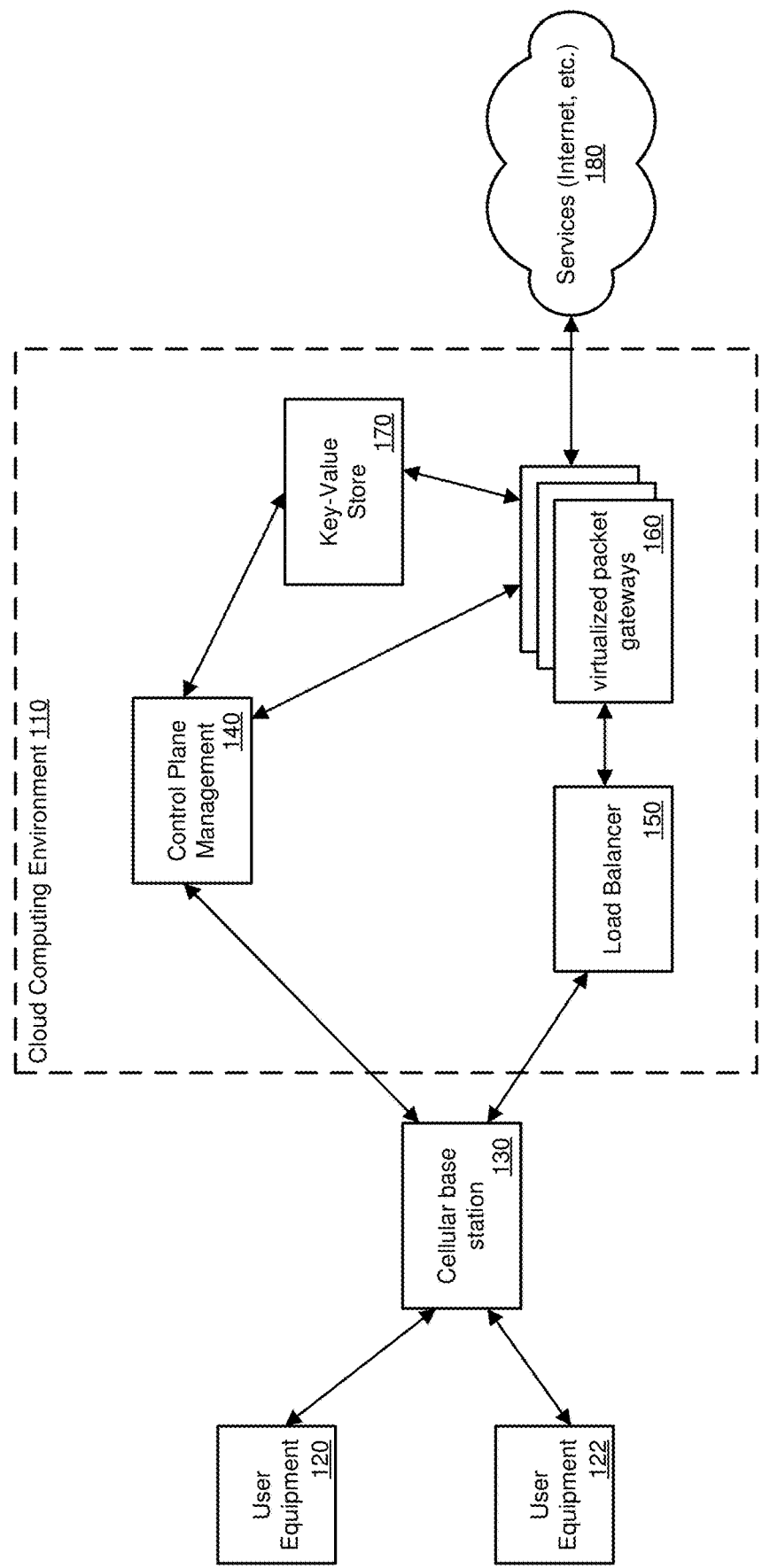
FIG. 1 is a diagram depicting an example cloud computing environment within which components of a cellular network, including virtualized packet gateways, are implemented.

As described herein, various techniques and solutions can be applied for operating a core cellular network stack within a cloud computing environment (e.g., a public cloud infrastructure). For example, virtualized packet gateways can be run on virtual machines of the cloud computing environment and standard load balancers can distribute network traffic of the cellular network among the virtualized packet gateways. The number of virtualized packet gateways can be scaled out (adding new virtualized packet gateways) or scaled down (removing virtualized packet gateways) with the load balancers distributing network traffic accordingly.

To provide the cellular network services within the cloud computing environment, a key-value store (e.g., a database, flat file, or another type of data store) is maintained. The key-value store stores bearer details for the current bearers of the cellular network. The bearer details define network flows associated with user equipment (e.g., mobile phones or other computing devices with cellular network connectivity) using the cellular network. The key-value store is a separate data store from the other components of the cellular network, such as the virtualized packet gateways. In other words, the key-value store is external to the virtualized packet gateways (also called an external key-value store). In some implementations, the key-value store maintains bear details for all of the current bearers of the cellular network (e.g., representing all of the current network flows that are active within the cellular network running within the cloud computing environment).

In the technologies described herein, data plane network packets are processed by virtualized packet gateways. For example, a number of virtualized packet gateways can be instantiated and run on virtual machines of the cloud computing environment to handle the data plane network packets being communicated to and from user equipment. In some implementations (e.g., an implementation operating an LTE cellular network), a virtualized packet gateway is a serving gateway (SGW), a packet gateway (PGW), or a serving gateway/packet gateway (SPGW). A serving gateway/packet gateway that processes data plane (also referred to as user plane) network packets is also referred to as an SPGW-U. A serving gateway/packet gateway that processes control plane network packets is also referred to as an SPGW-C.

In a traditional cellular network, a telecommunications provider operates the components of the system. The components can include the following.

User Equipment (UE). A device connected to the cellular network. For example, user equipment can include mobile phones or other computing devices with cellular communications capability.

Evolved Node B (eNodeB)—This component refers to the cellular network base station that the user equipment connects to via a wireless communications connection (e.g., cellular radio).

Mobile Management Entity (MME). This component controls access to the cellular network by the user equipment.

Serving Gateway/Packet Gateway (SPGW). Network packets to and from user equipment flow through the SPGW. The SPGW is provides a single anchor point that can be used to relay packets to the user equipment no matter where the user equipment moves (e.g., when the user equipment moves from cell tower to cell tower).

In the context of an LTE cellular network environment, the control plane and the data plane (user plane) are treated separately. The control plane is responsible for setting up, configuring, and tearing down connections in the data plane. The data plane carries the network packets to/from the user equipment.

In a cloud computing environment implementation, many SPGW instances may be needed to handle the volume of network traffic, with each SPGW instance running in its own virtual machine (VM). These virtual machine instances need information from the control plane so that they can correctly handle the data plane network packets.

A load balancer in a cloud computing environment is designed to distribute the network packets among the SPGW instances. A typical load balancer will distribute the network packets based on packet header information (e.g., source IP address and destination IP address from the IP header, source port and/or destination port numbers from the user datagram protocol (UDP) or transmission control protocol (TCP) headers, and/or from other packet header information). However, there is a problem with running SPGW instances within a cloud computing environment using traditional techniques. Specifically, when SPGW instances are run behind a load balancer, the control plane and data plane for a given user will often be directed to different SPGW instances. In this situation, it may not be possible for the control plane information to be sent to, or read by, the SPGW instance that needs it. One potential solution is to have the MME (e.g., the source of the control plane information) broadcast its control data to all SPGW instances. However, this potential solution is inefficient (e.g., requiring a substantial amount of network traffic) and may not scale beyond a small number of SPGWs.

Using the technologies described herein, a cellular network within a cloud computing environment can be operated more efficiently and reliably. For example, scaling-out can be performed by pre-loading the contents of a key-value store (e.g., the entire contents of the key-value store) onto a newly instantiated virtualized packet gateway. The virtualized packet gateway can then be prepared to process any data plane network packets that are directed to it by the load balancer during the scale-out event. As another example, bearers can be moved between virtualized packet gateways. For example, ownership information can be stored (e.g., in the key-value store) indicating which virtualized packet gateway is currently processing data plane network packets for a given bearer. If data plane network packets are directed to a different virtualized packet gateway (different from the current owner), then the different virtualized packet gateway can take ownership (e.g., register itself in the key-value store, replacing the previous owner). In this way, network flows for a bearer can be moved between virtualized packet gateways (e.g., due to a scale-down event or for some other reason such as network congestion or failure) without having to close the connection and begin a new network flow. As another example, bearers can be updated (e.g., while they are active and without having to close the bearer and setup a new one). For example, control plane management components (e.g., MMEs and/or gateways handling control plane traffic) can update bearer details in the key-value store. The control plane management components can signal to the virtualized packet gateway that owns the updated bearer, and the virtualized packet gateway can obtain the updated bearer details and use them during processing of data plane network packets for the bearer.

Operating a Cellular Network within a Cloud Computing Environment

In the technologies described herein, components of a cellular network can be implemented within a cloud computing environment (e.g., a public cloud environment and/or a private cloud environment). For example, standard load balancers of the cloud environment can be employed to distribute cellular network traffic (e.g., data plane network packets) among a collection (e.g., a cluster) of virtualized packet gateways (e.g., SPGW-Us). An external key-value store can store bearer details for current network flows within the cellular network. Scaling out of virtualized packet gateways can be performed by copying the entire contents of the external key-value store to the local cache of the new virtualized packet gateway so that the new virtualized packet gateway is ready to process any network flow that the load balancer sends to it. The technologies also enable bearers to be updated (e.g., for virtualized packet gateways to receive and apply updated bearer details) and moved (e.g., for bearers to be moved between virtualized packet gateways). Bearers can be moved and/or updated while they remain active and without having to close the bearers and set up new bearers.

FIG. 1 is a diagram depicting an example cloud computing environment 110 within which components of a cellular network (e.g., a virtual cellular network) are implemented. For example, the cloud computing environment 110 can be a public cloud environment or a private cloud environment. The cloud computing environment 110 provides the computing resources (e.g., servers, virtual machines, storage resources, networking services, etc.) upon which the components of the cellular network run.

As depicted in FIG. 1, user equipment 120 and 122 (e.g., mobile phones or other computing devices with cellular network connectivity) connects to the cellular network via a cellular base station 130 (e.g., a cell tower). For example, if the cellular network is a long-term evolution (LTE) cellular network, then the cellular base station 130 can be an eNodeB. Other types of cellular networks can be used as well, such as a 3G cellular network or a 5G cellular network (e.g., which could have a different type of cellular base station 130). While only two example user equipment 120 and 122 devices are depicted, the cellular network can typically support many more user equipment devices. Similarly, the cellular network will typically support a number of cellular base stations in different geographical locations.

As depicted in FIG. 1, a number of cellular network components are implemented within the cloud computing environment 110. A control plane management 140 component provides control plane services for the cellular network and handles control plane network traffic. For example, the control plane management 140 component can setup network flows (e.g., bearers) for the user equipment 120 and 122 to access services 180 (e.g., to public data networks (PDNs), such as the Internet or cellular data networks). Depending on the type of cellular network, the control plane management 140 component can comprise a number of different services. For example, for an LTE cellular network, the control plane management 140 component can comprise a mobile management entity (MME), serving and/or packet gateways handling control plane network traffic, load balancers, etc.

The key-value store 170 is a data store (e.g., a centralized data store or a distributed data store) containing bearer details for bearers of the cellular network. For example, when the control plane management 140 component receives a request from user equipment 120 to access a web site on the Internet (one of the services 180) or make to make a voice call, the control plane management 140 component sets up a bearer (e.g., which can include determining whether the user equipment 120 is authorized to access the service, such as checking data plans, billing information, etc.). As part of setting up the bearer, the control plane management 140 component stores the bearer details (e.g., TEIDs, QoS values, network bit rates such as download speeds, etc.) for the bearer in the key-value store 170. A bearer represents a type of network traffic (e.g., a network flow) for a specific user equipment device. Different bearers can be created for different types of network traffic and/or different applications, including phone calls, web browsing, special traffic (e.g., streaming video, a specific VoIP application, etc.), and/or different quality of service (QoS). A given user equipment device may have a number of currently active bearers representing different network flows. In some implementations, in order for a user equipment device to utilize a cellular network a bearer must first be established within the cellular network for the network flow.

The virtualized packet gateways 160 (e.g., a number of virtualized packet gateways in a cluster running on virtual machines) processes data plane network packets for the user equipment 120 and 122. For example, the virtualized packet gateways 160 processes data plane network packets that are transmitted between (to and from) the user equipment 120 and 122 and the services 180 (e.g., the Internet and/or other external networks).

When one of the virtualized packet gateways 160 receives the first data plane network packet for a given network flow (e.g., a voice call, access to a particular web site, etc.) from a particular user equipment device, the virtualized packet gateway obtains bearer details for the bearer from the key-value store 170 (e.g., the bearer will have been previously setup in the key-value store by the control plane management 140 component). The virtualized packet gateway can store the bearer details for the bearer in a local cache (e.g., a local key-value store of the virtualized packet gateway).

The data plane network packets (which are internet protocol (IP) network packets) between the user equipment 120 and 120 and the virtualized packet gateways 160 are encapsulated. In some implementations, the encapsulation is performed according GPRS tunneling protocol (GTP), such as GTP-U. For example, the encapsulation provides a way to manage the different network flows of a given user equipment device. The tunneling protocol assigns an identifier (e.g., a tunnel endpoint identifier (TEID)) to the bearer that is associated with a given network flow, and separate identifiers can be used for uplink data (data flowing from the user equipment device to the services 180) and downlink data (data flowing from the services 180 to the user equipment device). For example, a specific bearer can be setup for a specific network flow in which user equipment 120 is accessing a specific web site, where the bearer details comprise two identifiers (e.g., two TEIDs), one associated with uplink traffic and one associated with downlink traffic for the network flow.

The load balancer 150 distributes data plane network packets among the virtualized packet gateways 160. The load balancer 150 is a standard load balancer of the cloud computing environment 110 (e.g., a standard load balancer provided by a public cloud service provider) that directs network traffic based upon IP header information. Because the load balancer 150 is a standard load balancer, it does not direct network packets based upon encapsulated packet information (e.g., it is not a special-purpose load balancer that has been configured to work with the encapsulating protocol, such as the GTP-U protocol). While one example load balancer 150 is depicted in the figure, a number of load balancers can be used (e.g., multiple load balancer network devices).

Because the load balancer 150 is a standard load balancer, it will typically direct network packets for a given network flow to the same virtualized packet gateway based on the outer IP header information (e.g., source and destination IP addresses and/or port numbers). However, because the load balancer 150 does not know about the bearers (e.g., it does not examine the encapsulated packets or the encapsulating headers), there is no way to determine which of the virtualized packet gateways will receive a given bearer's network packets. One potential solution would be to communicate all bearer details to all of the virtualized packet gateways. However, this potential solution is inefficient (e.g., uses significant computing resources, including network bandwidth, processing resources, and storage).

Using the technologies described herein, more efficient solutions can be provided. For example, by using the key-value store 170 as the repository for the bearer details for the bearers of the cellular network, the virtualized packet gateways 160 can obtain the bearer details when needed. For example, when one of the virtualized packet gateways 160 receives a data plane network packet associated with an unknown bearer (e.g., a bearer that is not in the virtualized packet gateway's local cache), the virtualized packet gateway can obtain the bearer details for the bearer from the external key-value store 170 and store it in its local cache. This provides improvements in terms of computing resources (e.g., network bandwidth, processing resources, and storage) over a solution in which all bearer details are stored at each of the virtualized packet gateways 160.

Another potential problem with operating cellular network components within a cloud computing environment can occur during scale-out of the virtualized packet gateways 160. For example, during a scale-out event in which a new virtualized packet gateway is added to the virtualized packet gateways 160 (e.g., in which a new virtualized packet gateway instance is instantiated on a virtual machine), the load balancer 150 will start sending data plane network packets to the new virtual gateway in proportion to the number of virtualized packet gateways 160 (e.g., divide up the data plane network flows evenly among the virtualized packet gateways 160). If the new virtualized packet gateway starts receiving a large volume of network flows for bearers it has not seen yet, then the new virtualized packet gateway can be become overloaded (e.g., causing network packets to be delayed or dropped, which can result in network service delays or disruptions). One potential solution is to have the new virtualized packet gateway obtain bearer details from the key-value store 170 for each new bearer as it is encountered (e.g., upon receiving the first network packet associated with a given bearer). However, the new virtualized packet gateway can still become overloaded with the sudden influx of network traffic and corresponding new bearer details that need to be obtained when the new virtualized packet gateway begins operation and the load balancer 150 starts to direct network packets.

Using the technologies described herein, such problems with a scale-out event can be reduced or eliminated. For example, after a new virtualized packet gateway is created, and before it begins receiving data plane network packets from the load balancer 150, the bearer details can be copied from the key-value store 170 to a local cache of the new virtualized packet gateway. In some implementations, the entire copy of the key-value store 170 is saved to the local cache of the new virtualized packet gateway. Once the copy of the key-value store 170 has been stored at the new virtualized packet gateway, the load balancer 150 begins directing data plane network packets to the new virtualized packet gateway. Because the new virtualized packet gateway's local cache has been populated (e.g., pre-populated) with the bearer details, any data plane network packets it receives from the load balancer 150 will have associated bearer details in the local cache and the new virtualized packet gateway will be able to process them efficiently and without having to obtain the bearer details from the key-value store 170. This will result in savings in terms of network responsiveness (e.g., reduced latency) and reliability (e.g., reduced chance of a network service disruption to the user equipment).

Similar problems can occur during scale-down of the virtualized packet gateways 160. For example, the remaining virtualized packet gateways 160 can receive a portion of the network flows that were previously being serviced by the virtualized packet gateway that was taken out of service. However, in this situation the additional network flows being directed by the load balancer 150 to a given remaining virtualized packet gateway should not overload the remaining virtualized packet gateway. Therefore, the remaining virtualized packet gateway can obtain new bearer details from the key-value store 170 for the additional network flows when needed.

Another potential problem with operating cellular network components within a cloud computing environment can occur when bearers need to be moved between virtualized packet gateways and/or when bearer details need to be updated. For example, a bearer representing an ongoing network flow may need to be moved during a scale-out event, scale-down event, or for some other reason (e.g., network congestion or an overloaded virtualized packet gateway). In some solutions, bearers are tied to a specific virtualized packet gateway and cannot be moved (e.g., a failure of a virtualized packet gateway would result in failure of all of the bearers, and associated network flows, being served by the virtualized packet gateway). In the technologies described herein, bearers, and associated network flows, can be moved between virtualized packet gateways. For example, if the load balancer 150 directs a bearer's network flow to a different virtualized packet gateway, then the different virtualized packet gateway can obtain bearer details from the key-value store 170 upon receiving the first data plane network packet of the network flow and service that bearer. This solution can be performed during a scale-out event, a scale-down event, or due to some other reason that causes a network flow to move to a different virtualized packet gateway.

A similar problem can occur when a bearer needs to be updated. For example, a bearer may need to be updated due to a change in account status (e.g., bandwidth limits, types of services being accessed, billing issues, etc.). In some solutions, bearers cannot be updated during a network flow (e.g., if a change needs to be made, then a new bearer needs to be established, which reduces efficiency and requires additional computing resources). In the technologies described herein, bearers can be updated. In order to update bearers, the key-value store 170 can store ownership information for bearers that indicates which virtualized packet gateway owns each bearer (e.g., is current responsible for processing data plane network packets for the bearer). For example, when a virtualized packet gateway receives the first data plane network packet associated with a specific bearer (e.g., where the specific bearer is not in the local cache of the virtualized packet gateway and/or where packets for the specific bearer have not been processed before), the virtualized packet gateway can obtain the bearer details for the specific bearer from the key-value store 170 and register itself as the owner of the specific bearer in the key-value store 170 (e.g., the key-value store 170 can maintain separate tables with associations between bearers and virtualized packet gateways). When a bearer needs to be updated, the control plane management 140 component can update the bearer details in the key-value store 170, determine which virtualized packet gateway is the owner for the bearer, and alert the virtualized packet gateway so that the virtualized packet gateway can obtain the updated bearer details from the key-value store 170. This solution allows the bearer to be updated during the network flow without having to stop and re-establish a new network flow, which saves time, computing resources, and can reduce or eliminate network disruptions.

Figure 2:
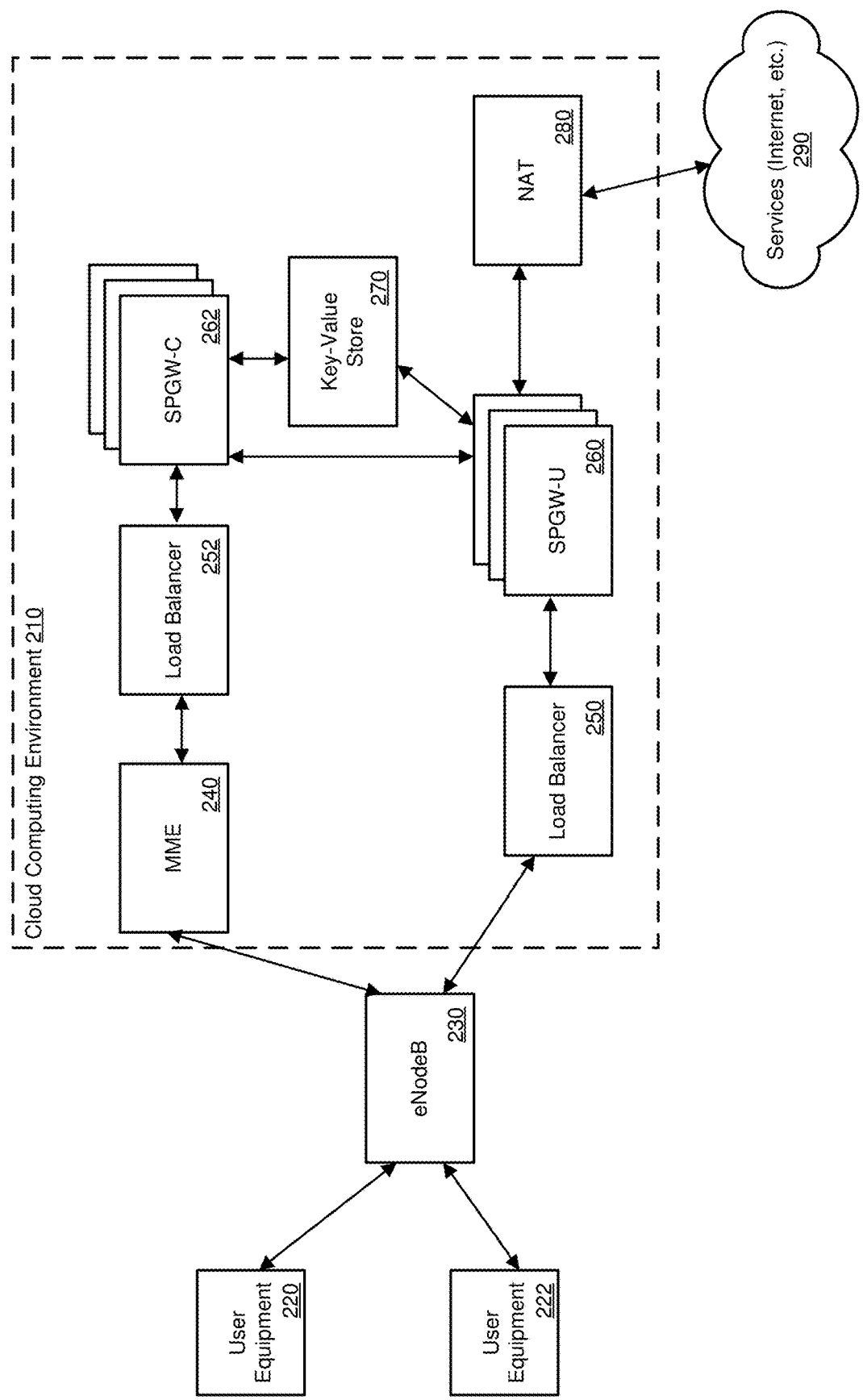
FIG. 2 is a diagram depicting an example cloud computing environment within which components of a cellular network, including SPGW-Us, are implemented.

FIG. 2 is a diagram depicting an example cloud computing environment 210 within which components of an LTE cellular network (e.g., a virtual LTE cellular network) are implemented, including SPGW-Us. For example, the cloud computing environment 210 can be a public cloud environment or a private cloud environment. The cloud computing environment 210 provides the computing resources (e.g., servers, virtual machines, storage resources, networking services, etc.) upon which the components of the cellular network run. Many of the components described with regard to FIG. 2 perform the same or similar functions as corresponding components described above with regard to FIG. 1.

As depicted in FIG. 2, user equipment 220 and 222 (e.g., mobile phones or other computing devices with cellular network connectivity) connects to the cellular network via an eNodeB 230 (e.g., a cellular base station within an LTE cellular network). Other types of cellular networks can be used as well, such as a 3G cellular network or a 5G cellular network. While only two example user equipment 220 and 222 devices are depicted, the cellular network can typically support many more user equipment devices. Similarly, the cellular network will typically support a number of cellular base stations in different geographical locations.

As depicted in FIG. 2, a number of cellular network components are implemented within the cloud computing environment 210. A number of components provide control plane services for the cellular network and handle control plane network traffic, including the MME 240 and the serving/packet gateways (SPGW-Cs) 262. For example, the MME 240, in conjunction with the SPGW-Cs 262, can setup network flows (e.g., bearers) for the user equipment 220 and 222 to access services 290 (e.g., to public data networks (PDNs), such as the Internet or cellular data networks). The load balancer 252 (or multiple load balancers in some implementations) can distribute control plane network traffic among a number of SPGW-Cs 262 (e.g., to handle the control plane network traffic load of the cellular network).

The key-value store 270 is a data store (e.g., a centralized data store or a distributed data store) containing bearer details for bearers of the cellular network. For example, when the MME 240 receives a request from user equipment 220 to access a web site on the Internet (one of the services 290) or make to make a voice call, the MME 240 sets up a bearer (e.g., which can include determining whether the user equipment 220 is authorized to access the service, such as checking data plans, billing information, etc.). For example, the MME 240 can instruct the SPGW-Cs 262 to configure the bearer and store the bearer details for the bearer in the key-value store 270. A bearer represents a type of network traffic (e.g., a network flow) for a specific user equipment device. Different bearers can be created for different types of network traffic and/or different applications, including phone calls, web browsing, special traffic (e.g., streaming video, a specific VoIP application, etc.), and/or different quality of service (QoS). A given user equipment device may have a number of currently active bearers representing different network flows. In some implementations, in order for a user equipment device to utilize a cellular network a bearer must first be established within the cellular network for the network flow.

The SPGW-Us 260 (e.g., a number of SPGW-Us in a cluster running on virtual machines) processes data plane network packets for the user equipment 220 and 222. For example, the SPGW-Us 260 process data plane network packets that are transmitted between (to and from) the user equipment 220 and 222 and the services 290 (e.g., the Internet and/or other external networks). In some implementations, a network address translation (NAT) service 280 is utilized for IP address translation between the SPGW-Us 260 and the services 290 (e.g., the Internet).

When one of the SPGW-Us 260 receives the first data plane network packet for a given network flow (e.g., a voice call, access to a particular web site, etc.) from a particular user equipment device, the SPGW-U obtains bearer details for the bearer from the key-value store 270 (e.g., the bearer will have been previously setup in the key-value store by the MME 240 and/or SPGW-Cs 262). The SPGW-U can store the bearer details for the bearer in a local cache (e.g., a local key-value store of the SPGW-U).

The data plane network packets (which are internet protocol (IP) network packets) between the user equipment 220 and 220 and the SPGW-Us 260 are encapsulated. In some implementations, the encapsulation is performed according GPRS tunneling protocol (GTP), such as GTP-U. For example, the encapsulation provides a way to manage the different network flows of a given user equipment device. The tunneling protocol assigns an identifier (e.g., a tunnel endpoint identifier (TEID)) to the bearer that is associated with a given network flow, and separate identifiers can be used for uplink data (data flowing from the user equipment device to the services 290) and downlink data (data flowing from the services 290 to the user equipment device). For example, a specific bearer can be setup for a specific network flow in which user equipment 220 is accessing a specific web site, where the bearer details comprise two identifiers (e.g., two TEIDs), one associated with uplink traffic and one associated with downlink traffic for the network flow.

The load balancer 250 distributes data plane network packets among the SPGW-Us 260. The load balancer 250 is a standard load balancer of the cloud computing environment 210 (e.g., a standard load balancer provided by a public cloud service provider) that directs network traffic based upon IP header information. Because the load balancer 250 is a standard load balancer, it does not direct network packets based upon encapsulated packet information (e.g., it is not a special-purpose load balancer that has been configured to work with the encapsulating protocol, such as the GTP-U protocol). While one example load balancer 250 is depicted in the figure, a number of load balancers can be used (e.g., multiple load balancer network devices).

Because the load balancer 250 is a standard load balancer, it will typically direct network packets for a given network flow to the same SPGW-U based on the outer IP header information (e.g., source and destination IP addresses and/or port numbers). However, because the load balancer 250 does not know about the bearers (e.g., it does not examine the encapsulated packets or the encapsulating headers), there is no way to determine which of the SPGW-Us will receive a given bearer's network packets. One potential solution would be to communicate all bearer details to all of the SPGW-Us. However, this potential solution is inefficient (e.g., uses significant computing resources, including network bandwidth, processing resources, and storage).

Using the technologies described herein, more efficient solutions can be provided. For example, by using the key-value store 270 as the repository for the bearer details for the bearers of the cellular network, the SPGW-Us 260 can obtain the bearer details when needed. For example, when one of the SPGW-Us 260 receives a data plane network packet associated with an unknown bearer (e.g., a bearer that is not in the SPGW-U's local cache), the SPGW-U can obtain the bearer details for the bearer from the external key-value store 270 and store it in its local cache. This provides improvements in terms of computing resources (e.g., network bandwidth, processing resources, and storage) over a solution in which all bearer details are stored at each of the SPGW-Us 260.

Another potential problem with operating cellular network components within a cloud computing environment can occur during scale-out of the SPGW-Us 262. For example, during a scale-out event in which a new SPGW-U is added to the SPGW-Us 262 (e.g., in which a new SPGW-U instance is instantiated on a virtual machine), the load balancer 250 will start sending data plane network packets to the new SPGW-U in proportion to the number of SPGW-Us 262 (e.g., divide up the data plane network flows evenly among the SPGW-Us 262). If the new SPGW-U starts receiving a large volume of network flows for bearers it has not seen yet, then the new SPGW-U can be become overloaded (e.g., causing network packets to be delayed or dropped, which can result in network service delays or disruptions). One potential solution is to have the new SPGW-U obtain bearer details from the key-value store 270 for each new bearer as it is encountered (e.g., upon receiving the first network packet associated with a given bearer). However, the new SPGW-U can still become overloaded with the sudden influx of network traffic and corresponding new bearer details that need to be obtained when the new SPGW-U begins operation and the load balancer 250 starts to direct network packets.

Using the technologies described herein, such problems with a scale-out event can be reduced or eliminated. For example, after a new SPGW-U is created, and before it begins receiving data plane network packets from the load balancer 250, the bearer details can be copied from the key-value store 270 to a local cache of the new SPGW-U. In some implementations, the entire copy of the key-value store 270 is saved to the local cache of the new SPGW-U. Once the copy of the key-value store 270 has been stored at the new SPGW-U, the load balancer 250 begins directing data plane network packets to the new SPGW-U. Because the new SPGW-U's local cache has been populated (e.g., pre-populated) with the bearer details, any data plane network packets it receives from the load balancer 250 will have associated bearer details in the local cache and the new SPGW-U will be able to process them efficiently and without having to obtain the bearer details from the key-value store 270. This will result in savings in terms of network responsiveness (e.g., reduced latency) and reliability (e.g., reduced chance of a network service disruption to the user equipment).

Similar problems can occur during scale-down of the SPGW-Us 262. For example, the remaining SPGW-Us 262 can receive a portion of the network flows that were previously being serviced by the SPGW-U that was taken out of service. However, in this situation the additional network flows being directed by the load balancer 250 to a given remaining SPGW-U should not overload the remaining SPGW-U. Therefore, the remaining SPGW-U can obtain new bearer details from the key-value store 270 for the additional network flows when needed.

Another potential problem with operating cellular network components within a cloud computing environment can occur when bearers need to be moved between SPGW-Us and/or when bearer details need to be updated. For example, a bearer representing an ongoing network flow may need to be moved during a scale-out event, a scale-down event, or for some other reason (e.g., network congestion or an overloaded SPGW-U). In some solutions, bearers are tied to a specific SPGW-U and cannot be moved (e.g., a failure of a SPGW-U would result in failure of all of the bearers, and associated network flows, being served by the SPGW-U). In the technologies described herein, bearers, and associated network flows, can be moved between SPGW-Us. For example, if the load balancer 250 directs a bearer's network flow to a different SPGW-U, then the different SPGW-U can obtain bearer details from the key-value store 270 upon receiving the first data plane network packet of the network flow and service that bearer. This solution can be performed during a scale-out event, a scale-down event, or due to some other reason that causes a network flow to move to a different SPGW-U.

A similar problem can occur when a bearer needs to be updated. For example, a bearer may need to be updated due to a change in account status (e.g., bandwidth limits, types of services being accessed, billing issues, etc.). In some solutions, bearers cannot be updated during a network flow (e.g., if a change needs to be made, then a new bearer needs to be established, which reduces efficiency and requires additional computing resources). In the technologies described herein, bearers can be updated. In order to update bearers, the key-value store 270 can store ownership information for bearers that indicates which SPGW-U owns each bearer (e.g., is current responsible for processing data plane network packets for the bearer). For example, when an SPGW-U receives the first data plane network packet associated with a specific bearer (where the specific bearer is not in the local cache of the SPGW-U and/or where packets for the specific bearer have not been processed before), the SPGW-U can obtain the bearer details for the specific bearer from the key-value store 270 and register itself as the owner of the specific bearer in the key-value store 270 (e.g., the key-value store 270 can maintain separate tables with associations between bearers and SPGW-Us). When a bearer needs to be updated, the MME 240 and/or SPGW-Cs 262 can update the bearer details in the key-value store 270, determine which SPGW-U is the owner for the bearer, and alert the SPGW-U so that the SPGW-U can obtain the updated bearer details from the key-value store 270. This solution allows the bearer to be updated during the network flow without having to stop and re-establish a new network flow, which saves time, computing resources, and can reduce or eliminate network disruptions.

In the example cloud computing environment 210, the SPGW-Us 260 are depicted as a combined solution in which the serving gateway and the packet gateway for the data plane traffic is combined into an integrated or co-located serving gateway/packet gateway component. However, in some implementations the serving gateway and the packet gateway are separate components that operate independently. For example, there can be various reasons why, for individual UEs, the SGW and PGW may be in different locations. One reason is domain name service (DNS) selection. When a UE attaches, the evolved packet core (EPC) can use a DNS server to separately select the SGW and PGW. The selection algorithm can use different criteria for each; SGW can be based on location (the SGW closest to the base station is normally chosen), whereas the PGW can be based on the access point name (APN) (which is in effect defining the type of service and network the UE needs to connect to). Another reason is roaming. There might be a scenario where the PGW is located in the Home Network, and the SGW is located in a Visited Network. This is typical for mobile virtual network operators (MVNOs) for instance.

In an implementation where the SGW and PGW are separate (e.g., in separate locations, such as running on different computing devices), they can communicate via an S5/S8 interface. There can be two flavors of this; one based on GTP tunnels, and another based on proxy mobile IPv6 (PMIPv6) (RFC 5213).

Figure 3:
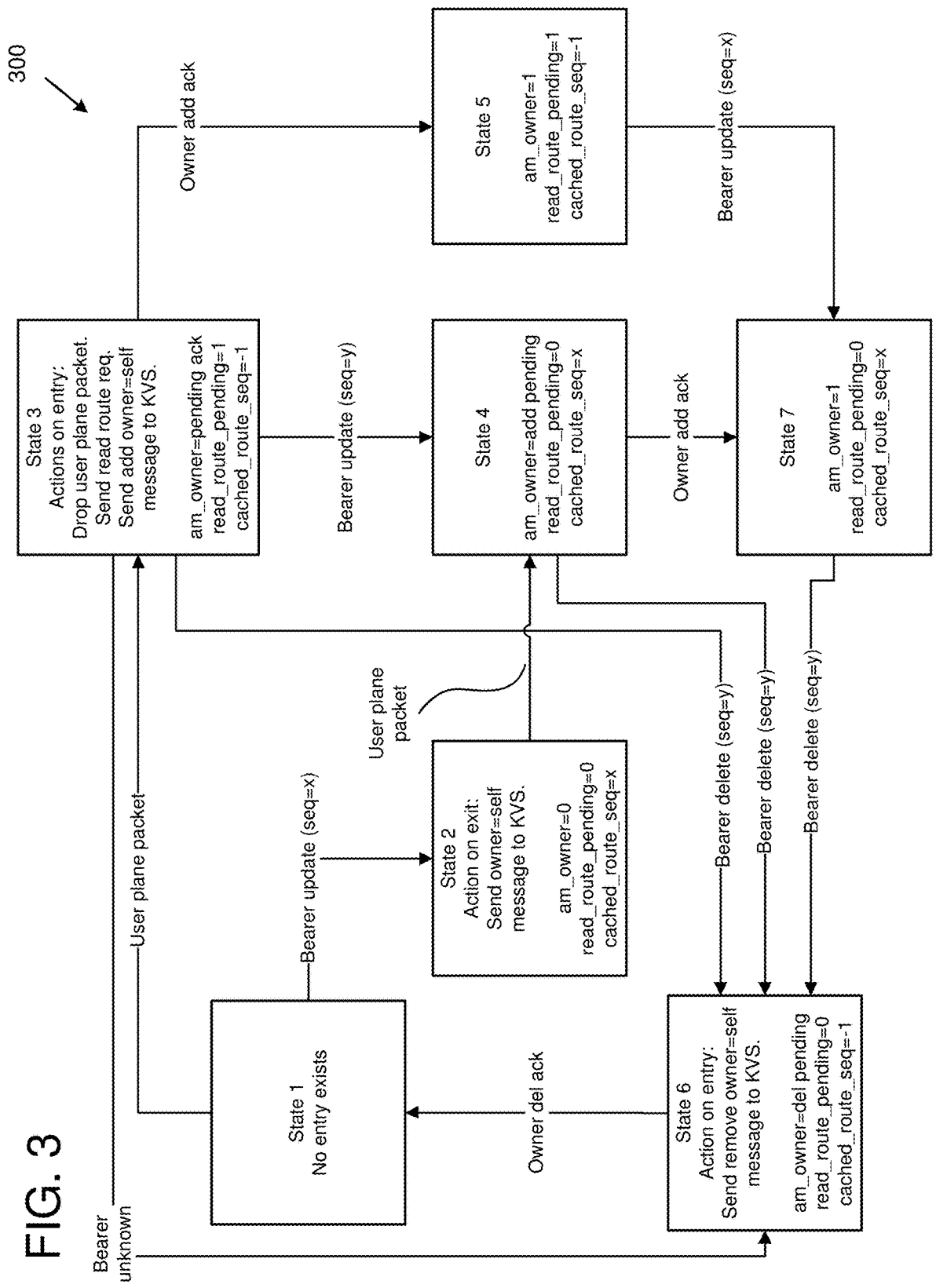
FIG. 3 is an example state machine illustrating data plane network packet flow and bearer status.

In implementations that use a combined SPGW, there is no S5/S8 interface needed. The SPGW-U will map from IP to GTP TEID in the downlink, and TEID to IP in the uplink. However, in implementations in which the SGW and PGW are separate and use an S5/S8 interface, the following mappings can be used:

PGW-u (GTP_based): downlink: IP to GTP TEID, uplink: GTP TEID to IP
SGW-u (GTP_based): downlink: GTP TEID to GTP TEID, uplink: GTP TEID to GTP TEID
PGW-u (PMIPv6 based): downlink: IP to generic routing encapsulation (GRE) tunnel, uplink: GRE tunnel to IP
SGW-u (PMIPv6 based): downlink: GRE tunnel to GTP TEID, uplink: GTP TEID to GRE tunnel FIG. 3 is an example state machine 300 illustrating data plane (user plane) network packet flow and bearer status (e.g., ownership, add, delete, and update). For example, the example state machine 300 can be implemented by the virtualized packet gateways (e.g., by virtualized packet gateways 160) and/or by the SPGWs (e.g., by SPGW-Us 260 and/or by SPGW-Cs 262). In some implementations, there is an instance of the state machine for every bearer.

In relation to the example state machine 300, there are a number of possible events that can occur, including:
1. Uplink packet arrives on the user plane—i.e., a packet from the UE going towards the PDN.
2. Downlink packet arrives on the user plane—i.e., from PDN to UE.
3. Bearer update packet arrives on the control plane, may be from MME or KVS.
4. Bearer unknown packet arrives on the control plane, from KVS.
5. Bearer delete packet arrives on the control plane, from MME.
6. Owner add acknowledgement packet arrives on the control plane, from the KVS.
7. Owner delete acknowledgement packet arrives on the control plane, from the KVS.

There are a number of variables used in relation to the example state machine 300, which are defined as follows.

Am_owner. This variable indicates whether we (e.g., the virtualized packet gateway) have told the KVS owner table that we are the owner of this bearer. The following values are possible.

| 0 | Have not told KVS that we are the owner. |
| Add pending | Have told the KVS that we are the owner but have not yet received an acknowledgement. |
| 1 | Have told the KVS that we are the owner and have received an acknowledgement from the KVS. |
| Del pending | Have told the KVS that we are no longer the owner but have not yet received an acknowledgement. |

Read_route_pending. A boolean recording whether the SPGW has requested the bearer details from the KVS. It is used to prevent the SPGW requesting the bearer details repeatedly while waiting for the bearer update to be read from the KVS.

| 0 | No bearer details read request has been sent. |
| 1 | Request has been sent. |

Cached_route_seq. An integer that records the sequence number that was present in the bearer update that we currently have stored in our local cache. A value of −1 indicates that the local cache is invalid.

The following states are depicted is an example state machine 300.
State 1: This state indicates that the bearer is unknown and there is no entry for it in the local cache.
States 2, 3, 4 and 5: These are all intermediate states that are passed through while becoming correctly configured to process user plane.
State 6: Intermediate state while removing knowledge of a bearer from the local cache.
State 7: The steady state we stay in while correctly configured to process user plane data.

Methods for Operating a Cellular Network within a Cloud Computing Environment

In any of the examples herein, methods can be provided for operating a virtual cellular network within a cloud computing environment. For example, virtualized packet gateways (e.g., serving and/or packet gateways) can be implemented on virtual machines running within the cloud computing environment and process data plane network packets for the cellular network.

Figure 4:
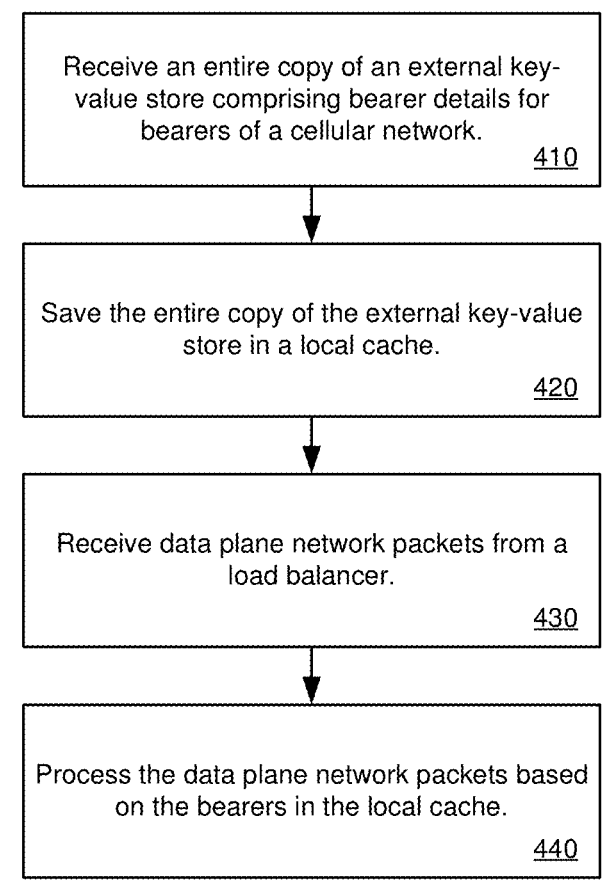
FIG. 4 is a flowchart of an example method for operating a virtualized packet gateway in a cloud computing environment to process data plane network packets for a cellular network.

FIG. 4 is a flowchart of an example method 400 for operating a virtualized packet gateway in a cloud computing environment to process data plane network packets for a cellular network. For example, the example method 400 can be performed by one of the virtualized packet gateways 160 or by one of the SPGW-Us 260.

At 410, an entire copy of an external key-value store is received. The external key value store comprises bearer details for all current bearers of the cellular network (e.g., all current bearers that use the cellular network implemented within the cloud computing environment). The bearer details define network flows associated with user equipment using the cellular network. For example, the external key-value store can be key-value store 170 or key-value store 270. At 420, the entire copy of the external key value store that was received at 410 is saved in a local cache.

At 430, data plane network packets are received from a load balancer. For example, the load balancer can direct network packets based upon internet protocol (IP) header information and not based on encapsulated packet information (e.g., not based upon tunnel identifiers or TEIDs).

At 440, the data plane network packets are processed by the virtualized packet gateway. The processing comprises identifying bearers associated with the data plane network packets in the local cache. For example, the virtualized packet gateway can obtain bearer details from the local cache based upon encapsulated network packet header information (e.g., TEIDs) in order to identify network flows (and their associated data plane network packets) and manage them according to their associated bearers (e.g., to set network bit rates, QoS parameters, etc.).

In some implementations, the example method 400 is performed during a scale-out event in which the virtualized packet gateway is instantiated on a virtual machine within the cloud computing environment. For example, once the virtualized packet gateway is up and running and has saved the entire copy of the key-value store in its local cache, it can indicate (e.g., signal or respond to a communication from) the load balancer that it is ready to receive data plane network packets. In response, the load balancer can begin directing network traffic to the virtualized packet gateway.

After the virtualized packet gateway is up and running and processing data plane network packets (e.g., as indicated at 440), the virtualized packet gateway can receive a new data plane network packet associated with a new bearer that is not in its local cache. When this happens, the virtualized packet gateway can obtain bearer details for the new bearer from the external key-value store, store the bearer details in its local cache, and process the new data plane network packet based at least in part upon the bearer details for the new bearer. The virtualized packet gateway can also register itself as the owner of the new bearer in the external key-value store.

In some implementations, the virtualized packet gateway keeps track of when it last processed data plane network packets for each bearer in its local cache. For example, when the virtualized packet gateway processes packets for a bearer, it can record the timing information (e.g., a timestamp or other timing information) in its local cache in association with the bearer. The virtualized packet gateway can use the recorded timing information to purge bearers from its local cache. While the example method 400 allows the virtualized packet gateway to begin operation in an efficient manner with an entire copy of the external key-value store, many of the bearers in the key-value store will not be used by the virtualized packet gateway (e.g., they will be directed to other virtualized packet gateways by the load balancer). Therefore, if data plane network packets are not processed by the virtualized packet gateway for a period of time (e.g., if packets have not been processed for a threshold time period), then the virtualized packet gateway can remove them from its local cache, which can save local storage resources.

Figure 5:
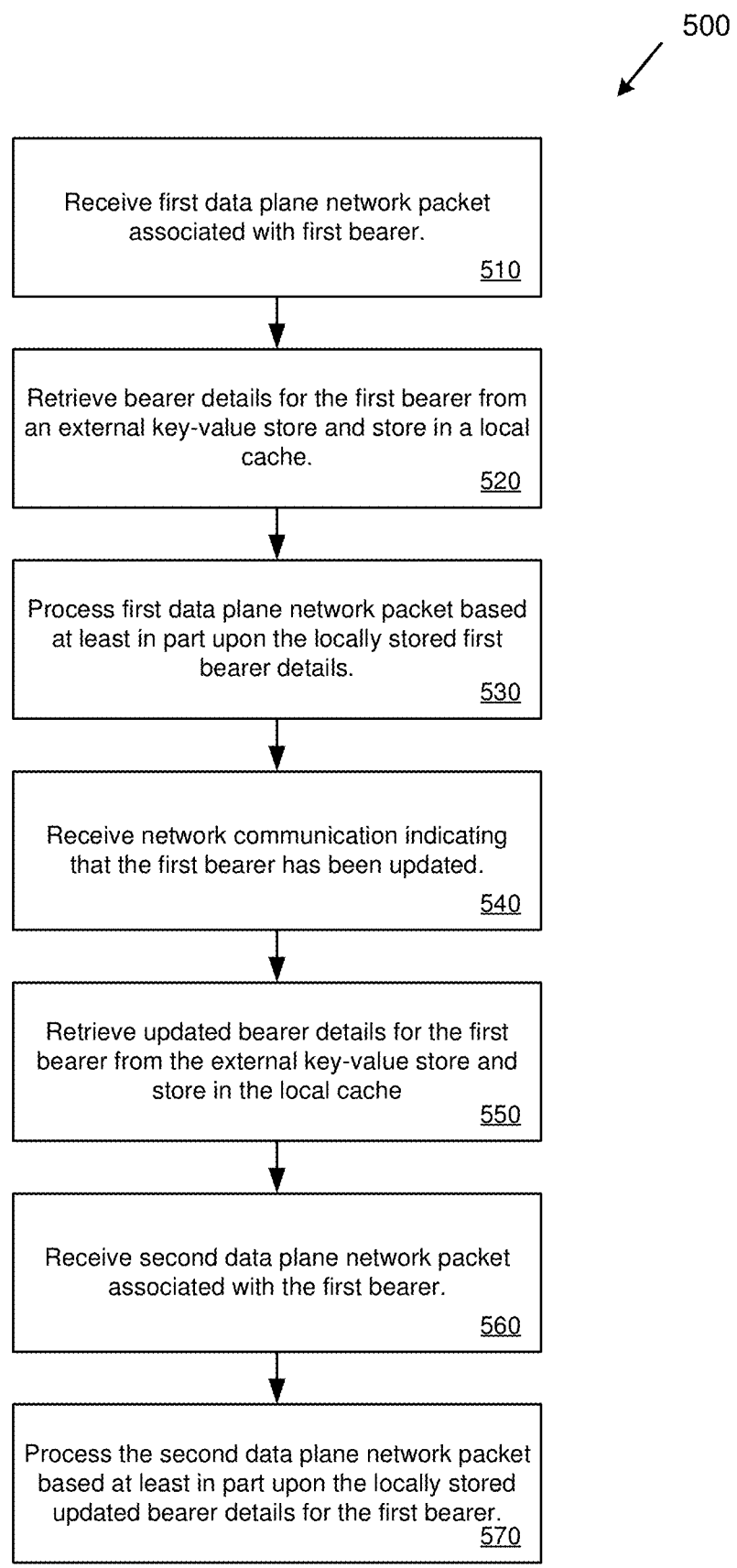
FIG. 5 is a flowchart of an example method for operating a virtualized packet gateway in a cloud computing environment to process data plane network packets for a cellular network.

FIG. 5 is a flowchart of an example method 500 for operating a virtualized packet gateway in a cloud computing environment to process data plane network packets for a cellular network. For example, the example method 500 can be performed by one of the virtualized packet gateways 160 or by one of the SPGW-Us 260.

At 510, a first data plane network packet associated with a first bearer is received by the virtualized packet gateway. For example, the first data plane network packet can be received from a load balancer at the start of a network flow.

At 520, in response to determining that the first bearer is not in a local cache of the virtualized packet gateway, bearer details for the first bearer are retrieved from an external key-value store. The retrieved bearer details for the first bearer are stored in a local cache at the virtualized packet gateway (e.g., in a local key-value store). For example, the external key-value store can be key-value store 170 or key-value store 270.

At 530, the first data plane network packet is processed based at least in part upon the locally stored first bearer details (stored in the local cache).

At 540, a communication is received indicating that the first bearer has been updated. For example, the communication can be received from an MME or from another component of the cellular network (e.g., from a virtualized packet gateway managing the control plane). The communication can be a network control message.

At 550, in response to the communication indicating that the first bearer has been updated, updated bearer details for the first bearer are retrieved from the external key-value store and stored in the local cache. For example, the first bearer could be updated to reflect a different download bit rate (e.g., based on the user going over their monthly limit).

At 560, a second data plane network packet associated with the first bearer is received by the virtualized packet gateway. The second data plane network packet is a subsequent network packet received from the load balancer as part of the same network flow as the first data plane network packet.

At 570, the second data plane network packet is processed based at least in part upon the locally stored updated bearer details for the first bearer In some implementations, one or more of the following components can be implemented within a cloud computing environment to process data plane network packets. The components can perform one or more of the following operations and/or other operations. For example, a virtualized packet gateway can be configured, via computer-executable instructions, to store bearer details for bearers in a local key-value store, where the bear details are obtained from an external key-value store, register ownership of bearers being serviced by the virtualized packet gateway in the external key-value store, and process network packets based at least in part upon the bearer details stored the local key-value store. A mobile management entity can be configured, via computer-executable instructions, to setup bearers in the external key-value store, update bearer details for bearers in the external key-value store, and notify the virtualized packet gateway of updated bearer details. The external key-value store can be configured, via computer-executable instructions, to store bearer details for current bearers of the cellular network, and store ownership information indicating ownership relationships between virtualized packet gateways and bearers.

Example Bearer Setup

This section illustrates how a bearer is setup in a specific implementation of an LTE cellular network using the technologies described herein. In order to illustrate the differences, the bearer setup sequence is first described for a traditional LTE system and then described with regard to the technologies described herein.

The following sequence illustrates a traditional bearer setup (which does not use a cloud computing environment) and processing of the first user plane data traffic:

UE/eNodeB sends MME bearer setup request (a control plane message).

MME sends bearer setup request to SPGW.

SPGW stores bearer details from setup request.
SPGW responds to MME, saying bearer setup complete.
Then, if uplink data is first:
   SPGW receives user plane packet from eNodeB.
   SPGW un-encapsulates user plane packet and forwards to target public data network (PDN).
   SPGW receives user plane packet from PDN.
   SPGW looks up destination IP address, finds that it matches UE IP address from bearer details stored above. If packet matches traffic flow template (TFT) from bearer details, then encapsulates packet using eNodeB TEID from bearer details.
   SPGW forwards encapsulated packet to eNodeB.
Or, if downlink data is first:
   SPGW receives user plane packet from target PDN.
   SPGW looks up destination IP address, finds a match and proceeds as in the uplink case.

Using the technologies described herein in which virtualized packet gateways (e.g., SPGW-Cs and/or SPGW-Us) are implemented within a cloud computing environment using an external key-value store (also called a shared key-value store), the sequence is as follows:
   eNodeB sends MME bearer setup request (a control plane message).
   MME sends bearer setup request to SPGW-C load balancer.
   Load balancer forwards request to SPGW-C1 (instance 1), for example.
   SPGW-C1 stores UE IP address, TEIDs (both SPGW and eNodeB values) and eNodeB's IP in shared Key Value Store.
   SPGW-C1 responds to MME, saying bearer setup complete.
   eNodeB sends user plane packet to SPGW-U load balancer.
   Load balancer forwards user plane packet to SPGW-U2 (instance 2), for example.
Then, if uplink data is first:
   SPGW-U2 receives user plane packet from eNodeB.
   SPGW-U2 looks up TEID from packet in shared Key Value Store. Gets eNodeB's TEID in response.
   SPGW-U2 writes to the shared Key Value Store its IP address as the "cache owner" of this network flow.
   SPGW-U2 writes UE IP address, TEIDs (both SPGW and eNodeB values) and eNodeB's IP into local cache.
   SPGW-U2 un-encapsulates user plane packet and forwards to target PDN.
   SPGW-U2 receives user plane packet from PDN.
   SPGW-U2 looks in its local cache for destination IP address, finds that it matches UE IP address from bearer details stored above. If packet matches TFT from bearer details, then encapsulates packet using eNodeB TEID from bearer details.
   SPGW-U2 forwards encapsulated packet to eNodeB.
Or, if downlink data is first:
   SPGW-U load balancer receives user plane packet from target PDN.
   Load balancer forwards to SPGW-U2.
   SPGW-U2 looks in its local cache of bearer details. Finds no match.
   SPGW-U2 looks up UE IP address in shared Key Value Store. Gets bearer details in response. Writes into local cache.
   SPGW-U2 writes to the shared Key Value Store its IP address as the "cache owner" of this flow.
   SPGW-U2 forwards encapsulated packet to eNodeB.
   SPGW-U2 receives user plane packet from eNodeB, un-encapsulates and forwards to target PDN.

Computing Systems

Figure 6:
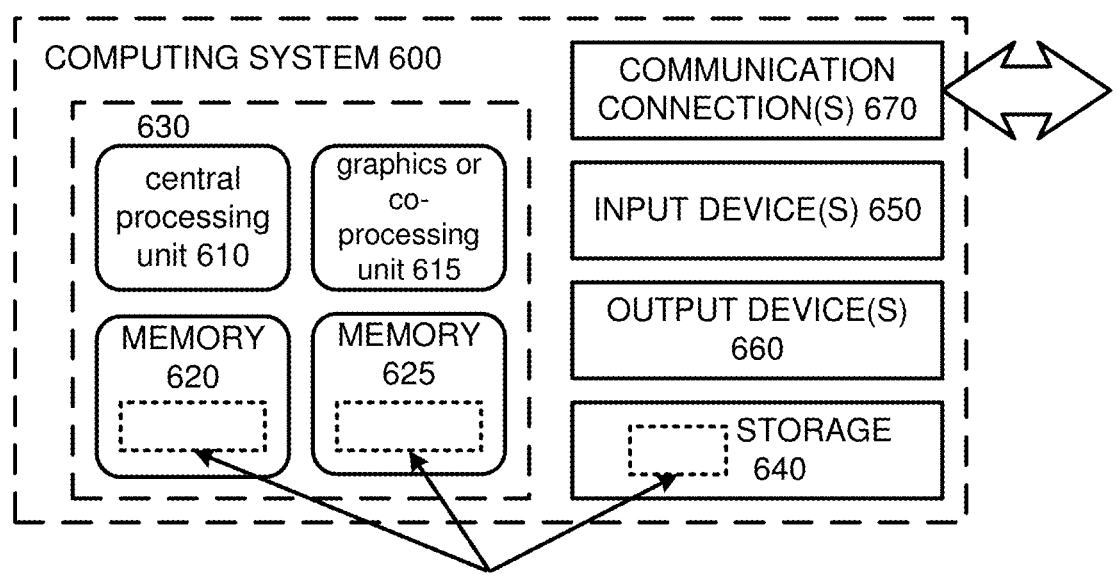
FIG. 6 is a diagram of an example computing system in which some described embodiments can be implemented.

FIG. 6 depicts a generalized example of a suitable computing system 600 in which the described technologies may be implemented. The computing system 600 is not intended to suggest any limitation as to scope of use or functionality, as the technologies may be implemented in diverse general-purpose or special-purpose computing systems.

With reference to FIG. 6, the computing system 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more technologies described herein, in the form of computer-executable instructions suitable for execution by the processing unit(s).

A computing system may have additional features. For example, the computing system 600 includes storage 640, one or more input devices 650, one or more output devices 660, and one or more communication connections 670. An interconnection mechanism (not shown) such as a bus, controller, or network interconnects the components of the computing system 600. Typically, operating system software (not shown) provides an operating environment for other software executing in the computing system 600, and coordinates activities of the components of the computing system 600.

The tangible storage 640 may be removable or non-removable, and includes magnetic disks, magnetic tapes or cassettes, CD-ROMs, DVDs, or any other medium which can be used to store information and which can be accessed within the computing system 600. The storage 640 stores instructions for the software 680 implementing one or more technologies described herein.

The input device(s) 650 may be a touch input device such as a keyboard, mouse, pen, or trackball, a voice input device, a scanning device, or another device that provides input to the computing system 600. For video encoding, the input device(s) 650 may be a camera, video card, TV tuner card, or similar device that accepts video input in analog or digital form, or a CD-ROM or CD-RW that reads video samples into the computing system 600. The output device(s) 660 may be a display, printer, speaker, CD-writer, or another device that provides output from the computing system 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The technologies can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Mobile Device

Figure 7:
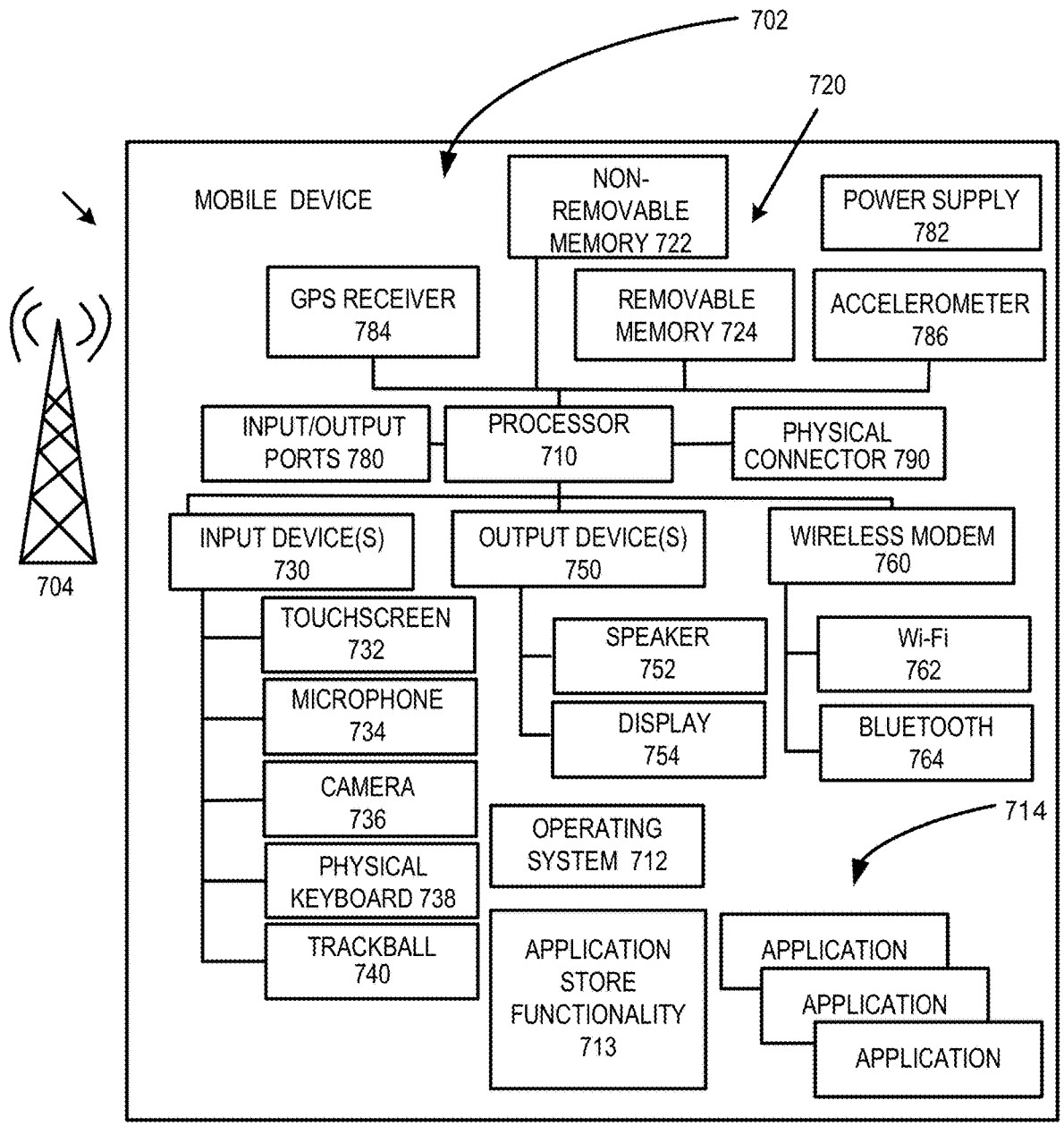
FIG. 7 is an example mobile device that can be used in conjunction with the technologies described herein.

FIG. 7 is a system diagram depicting an example mobile device 700 including a variety of optional hardware and software components, shown generally at 702. Any components 702 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 704, such as a cellular, satellite, or other network.

For example, the example mobile device 700 can be a user equipment device (e.g., user equipment 120, 122, 220, or 222) that uses a cellular network (e.g., mobile communications network 704). The example mobile device 700 can communicate with the cellular network via the wireless modem 760.

The illustrated mobile device 700 can include a controller or processor 710 (e.g., signal processor, microprocessor, ASIC, or other control and processing logic circuitry) for performing such tasks as signal coding, data processing, input/output processing, power control, and/or other functions. An operating system 712 can control the allocation and usage of the components 702 and support for one or more application programs 714. The application programs can include common mobile computing applications (e.g., email applications, calendars, contact managers, web browsers, messaging applications), or any other computing application. Functionality 713 for accessing an application store can also be used for acquiring and updating application programs 714.

The illustrated mobile device 700 can include memory 720. Memory 720 can include non-removable memory 722 and/or removable memory 724. The non-removable memory 722 can include RAM, ROM, flash memory, a hard disk, or other well-known memory storage technologies. The removable memory 724 can include flash memory or a Subscriber Identity Module (SIM) card, which is well known in GSM communication systems, or other well-known memory storage technologies, such as "smart cards." The memory 720 can be used for storing data and/or code for running the operating system 712 and the applications 714. Example data can include web pages, text, images, sound files, video data, or other data sets to be sent to and/or received from one or more network servers or other devices via one or more wired or wireless networks. The memory 720 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 700 can support one or more input devices 730, such as a touchscreen 732, microphone 734, camera 736, physical keyboard 738 and/or trackball 740 and one or more output devices 750, such as a speaker 752 and a display 754. Other possible output devices (not shown) can include piezoelectric or other haptic output devices. Some devices can serve more than one input/output function. For example, touchscreen 732 and display 754 can be combined in a single input/output device.

The input devices 730 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 712 or applications 714 can comprise speech-recognition software as part of a voice user interface that allows a user to operate the device 700 via voice commands. Further, the device 700 can comprise input devices and software that allows for user interaction via a user's spatial gestures, such as detecting and interpreting gestures to provide input to a gaming application.

A wireless modem 760 can be coupled to an antenna (not shown) and can support two-way communications between the processor 710 and external devices, as is well understood in the art. The modem 760 is shown generically and can include a cellular modem for communicating with the mobile communication network 704 and/or other radio-based modems (e.g., Bluetooth 764 or Wi-Fi 762). The wireless modem 760 is typically configured for communication with one or more cellular networks, such as a GSM network for data and voice communications within a single cellular network, between cellular networks, or between the mobile device and a public switched telephone network (PSTN).

The mobile device can further include at least one input/output port 780, a power supply 782, a satellite navigation system receiver 784, such as a Global Positioning System (GPS) receiver, an accelerometer 786, and/or a physical connector 790, which can be a USB port, IEEE 1394 (FireWire) port, and/or RS-232 port. The illustrated components 702 are not required or all-inclusive, as any components can be deleted and other components can be added.

Cloud-Supported Environment

Figure 8:
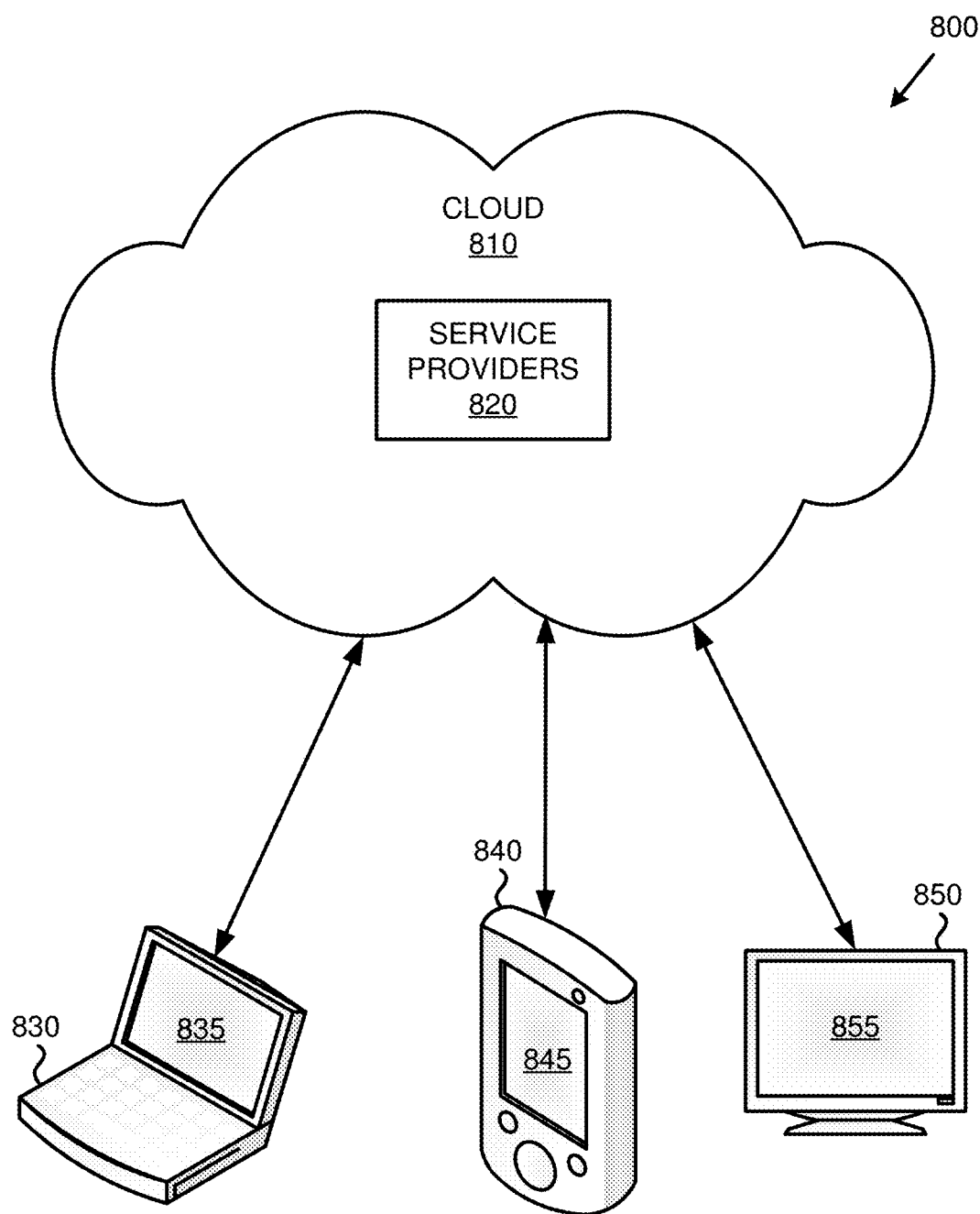
FIG. 8 is an example cloud-support environment that can be used in conjunction with the technologies described herein.

FIG. 8 illustrates a generalized example of a suitable cloud-supported environment 800 in which described embodiments, techniques, and technologies may be implemented. In the example environment 800, various types of services (e.g., computing services) are provided by a cloud 810. For example, the cloud 810 can comprise a collection of computing devices, which may be located centrally or distributed, that provide cloud-based services to various types of users and devices connected via a network such as the Internet. The implementation environment 800 can be used in different ways to accomplish computing tasks. For example, some tasks (e.g., processing user input and presenting a user interface) can be performed on local computing devices (e.g., connected devices 830, 840, 850) while other tasks (e.g., storage of data to be used in subsequent processing) can be performed in the cloud 810.

In example environment 800, the cloud 810 provides services for connected devices 830, 840, 850 with a variety of screen capabilities. Connected device 830 represents a device with a computer screen 835 (e.g., a mid-size screen). For example, connected device 830 could be a personal computer such as desktop computer, laptop, notebook, netbook, or the like. Connected device 840 represents a device with a mobile device screen 845 (e.g., a small size screen). For example, connected device 840 could be a mobile phone, smart phone, personal digital assistant, tablet computer, and the like. Connected device 850 represents a device with a large screen 855. For example, connected device 850 could be a television screen (e.g., a smart television) or another device connected to a television (e.g., a set-top box or gaming console) or the like. One or more of the connected devices 830, 840, 850 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 800. For example, the cloud 810 can provide services for one or more computers (e.g., server computers) without displays.

Services can be provided by the cloud 810 through service providers 820, or through other providers of online services (not depicted). For example, cloud services can be customized to the screen size, display capability, and/or touchscreen capability of a particular connected device (e.g., connected devices 830, 840, 850).

In example environment 800, the cloud 810 provides the technologies and solutions described herein to the various connected devices 830, 840, 850 using, at least in part, the service providers 820. For example, the service providers 820 can provide a centralized solution for various cloud-based services. The service providers 820 can manage service subscriptions for users and/or devices (e.g., for the connected devices 830, 840, 850 and/or their respective users).

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 6, computer-readable storage media include memory 620 and 625, and storage 640. By way of example and with reference to FIG. 7, computer-readable storage media include memory and storage 720, 722, and 724. The term computer-readable storage media does not include signals and carrier waves. In addition, the term computer-readable storage media does not include communication connections, such as 670, 760, 762, and 764.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. One or more computing devices comprising:
   processors; and
   memory;
   the one or more computing devices configured, via computer-executable instructions, to perform operations for operating a virtualized packet gateway in a cloud computing environment to process data plane network packets for a cellular network, the operations comprising:
   receiving an entire copy of an external key-value store, wherein the external key-value store comprises bearer details for all current bearers of the cellular network, wherein the bearer details define network flows associated with user equipment using the cellular network;
   saving the entire copy of the external key-value store in a local cache;
   receiving data plane network packets from a load balancer; and
   processing, by the virtualized packet gateway, the data plane network packets, wherein the processing comprises identifying bearers associated with the data plane network packets in the local cache.

2. The one or more computing devices of claim 1 wherein the operations are performed during a scale out event in which the virtualized packet gateway is instantiated within the cloud computing environment.

3. The one or more computing devices of claim 1 wherein the virtualized packet gateway is a serving gateway/packet gateway for data plane network packets (SPGW-U) that operates on a virtual machine running in the cloud computing environment.

4. The one or more computing devices of claim 3 wherein the SPGW-U operates as part of a long-term evolution (LTE) cellular network for a telecom provider.

5. The one or more computing devices of claim 1, the operations further comprising:
   receiving, from the load balancer, a new data plane network packet that is associated with a new bearer that is not present in the local cache;
   responsive to receiving the new data plane network packet:
      obtaining bearer details for the new bearer from the external key-value store;
      storing the bearer details for the new bearer in the local cache; and
      processing the new data plane network packet based at least in part upon the bearer details for the new bearer.

6. The one or more computing devices of claim 5, the operations further comprising:
   responsive to receiving the new data plane network packet:
      registering the virtualized packet gateway as the owner of the new bearer in the external key-value store.

7. The one or more computing devices of claim 1 wherein the load balancer directs network packets based upon internet protocol (IP) header and the user datagram protocol (UDP) or transmission control protocol (TCP) port numbers, and not based on encapsulated packet information.

8. The one or more computing devices of claim 1, the operations further comprising, for each of one or more bearers in the local cache:
   marking the bearer in the local cache with an indication of when data plane network packets were last processed for the bearer.

9. The one or more computing devices of claim 8, the operations further comprising:
   purging bearers from the local cache based on the indications of when data plane network packets were last processed.

10. A method, implemented by a computing device, for operating a virtualized packet gateway in a cloud computing environment to process data plane network packets for a cellular network, the method comprising:
    by the virtualized packet gateway during a scale out event in which the virtualized packet gateway is instantiated within the cloud computing environment:
       receiving an entire copy of an external key-value store, wherein the external key-value store comprises bearer details for all current bearers of the cellular network, wherein the bearer details define network flows associated with user equipment using the cellular network;
       saving the entire copy of the external key-value store in a local cache;
       receiving data plane network packets from a load balancer; and
       processing, by the virtualized packet gateway, the data plane network packets, wherein the processing comprises identifying bearers associated with the data plane network packets in the local cache.

11. The method of claim 10, further comprising:
    receiving, from the load balancer, a new data plane network packet that is associated with a new bearer that is not present in the local cache;
    responsive to receiving the new data plane network packet:
       obtaining bearer details for the new bearer from the external key-value store;
       storing the bearer details for the new bearer in the local cache; and
       processing the new data plane network packet based at least in part upon the bearer details for the new bearer.

12. The method of claim 11, further comprising:
    responsive to receiving the new data plane network packet:
       registering the virtualized packet gateway as the owner of the new bearer in the external key-value store.

13. The method of claim 10 wherein the virtualized packet gateway is a serving gateway/packet gateway for data plane network packets (SPGW-U) that operates on a virtual machine running in the cloud computing environment.

14. The method of claim 10 wherein the load balancer directs network traffic based upon internet protocol (IP) header information and not based on encapsulated packet information.

15. A method, implemented by a computing device, for operating a virtualized packet gateway in a cloud computing environment to process data plane network packets for a cellular network, the method comprising:

by the virtualized packet gateway:
receiving a first data plane network packet associated with a first bearer;
upon determining that the first bearer is not in a local cache, retrieving bearer details for the first bearer from an external key-value store and storing the retrieved bearer details for the first bearer in the local cache;
processing the first data plane network packet based at least in part upon the bearer details for the first bearer stored in the local cache;
receiving a network communication indicating that the first bearer has been updated;
responsive to receiving the network communication, retrieving updated bearer details for the first bearer from the external key-value store and storing the retrieved updated bearer details in the local cache;
receiving a second data plane network packet associated with the first bearer; and
processing the second data plane network packet based at least in part upon the updated bearer details for the first bearer stored in the local cache.

16. The method of claim 15 wherein the network communication indicating that the first bearer has been updated is received from a mobile management entity (MME) or from a gateway handling control plane network traffic.

17. The method of claim 15, further comprising:
registering the virtualized packet gateway as the owner of the first bearer in the external key-value store.

18. The method of claim 15 wherein the virtualized packet gateway is a serving gateway/packet gateway for data plane network packets (SPGW-U) that operates on a virtual machine running in the cloud computing environment.

19. The method of claim 15 wherein the first data plane network packet and the second data plane network packet are received from a load balancer, wherein the load balancer directs network traffic based upon internet protocol (IP) header and the user datagram protocol (UDP) or transmission control protocol (TCP) port numbers, and not based on encapsulated packet information.

20. The method of claim 15, further comprising:
receiving a third data plane network packet associated with a second bearer;
upon determining that the second bearer is not in a local cache, retrieving bearer details for the second bearer from the external key-value store and storing the retrieved bearer details for the second bearer in the local cache;
registering the virtualized packet gateway as the owner of the second bearer in the external key-value store; and
processing the third data plane network packet based at least in part upon the bearer details for the second bearer stored in the local cache.

* * * * *